United States Patent [19]

Avedik et al.

[11] 4,138,658

[45] Feb. 6, 1979

[54] RECORDING OCEAN BOTTOM DEVICE, SUCH AS A SEISMOGRAPH

[75] Inventors: Felix Avedik, Locmaria Plouzane; Vincent Renard, Lanildut, both of France

[73] Assignee: Etablissement Public dit "Centre National pour l'Exploitation des Oceans", Paris, France

[21] Appl. No.: 801,864

[22] Filed: May 31, 1977

[30] Foreign Application Priority Data

Jun. 4, 1976 [FR] France .............................. 76 17642

[51] Int. Cl.² ........................................... G01V 1/38
[52] U.S. Cl. .................................. 340/7 R; 181/110; 181/122; 340/9; 340/5 R
[58] Field of Search .................. 340/2, 5 R, 7 R, 8 S, 340/16 C

[56] References Cited

U.S. PATENT DOCUMENTS

| 3,130,703 | 4/1964 | Thompson | 340/2 |
| 3,848,226 | 11/1974 | Perez | 340/16 C |

OTHER PUBLICATIONS

"Deep Sea Instrument Capsule", Snodgrass, SCIENCE, vol. 162, Oct. 1968, pp. 78–87.

*Primary Examiner*—Howard A. Birmiel
*Attorney, Agent, or Firm*—Charles A. Laff; J. Warren Whitesel; Howard B. Rockman

[57] ABSTRACT

A seismograph pickup for use at the bottom of the sea, comprises a detector, a frame, detachable ballast, and a sealed and water-tight container mounted on the frame. The container floats for bringing the pickup to the surface when the ballast is detached. The detector is outside the container so that it may be deposited on the sea bed. The detector is connected to the container by means of an electric transmission cable and a mooring cable. The container includes a power source and means for recording signals delivered by the detector. The invention is also concerned with means for supporting the detector on the frame and for unhooking it when the detector is released.

17 Claims, 5 Drawing Figures

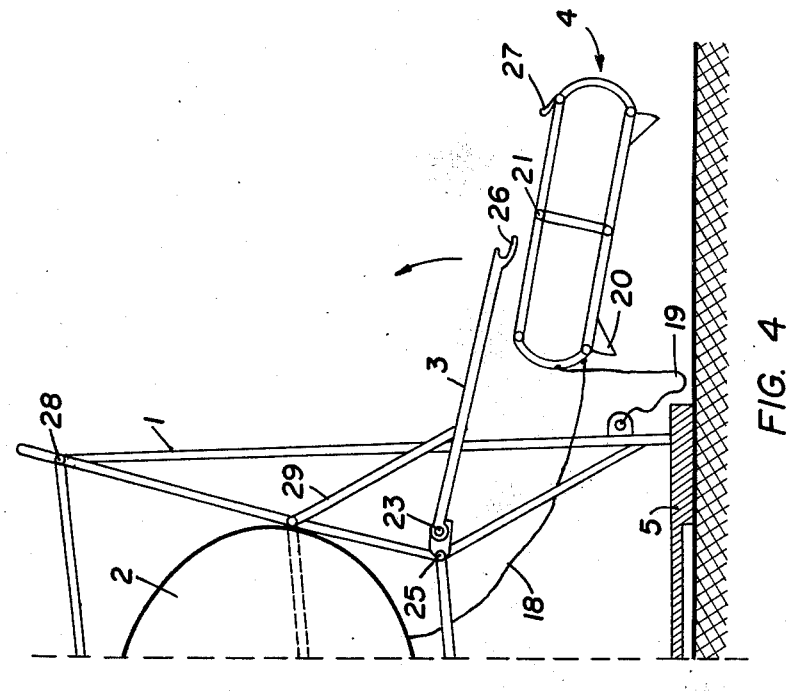
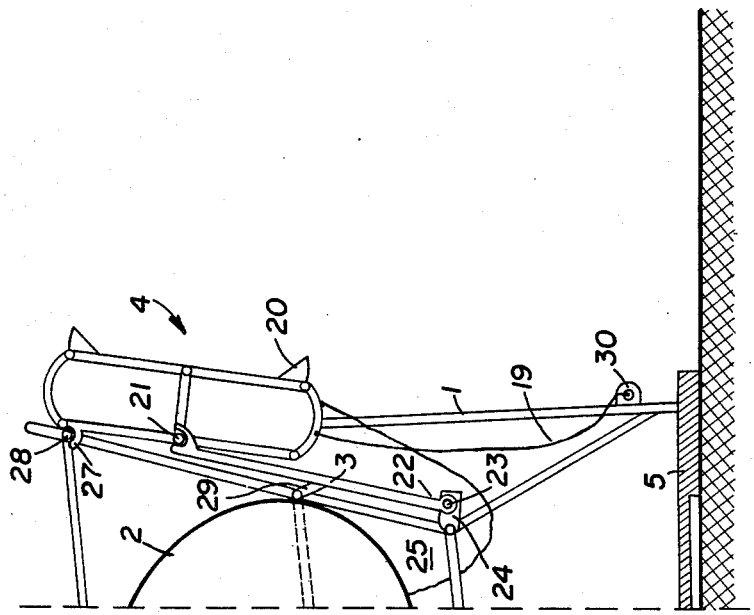

RECORDING OCEAN BOTTOM DEVICE, SUCH AS A SEISMOGRAPH

The present invention concerns a signal pick-up, such as a refraction seismograph, intended to be used at the bottom of the sea, and then recovered on the surface of the water. A seismograph is an apparatus intended on measuring vibrations from the earth's crust. Therefore, in order to function correctly, the seismograph must make mechanical contact with the earth's crust, either directly or by means of an intermediary structure which transmits the vibrations to be measured. The seismograph, which will be more particularly described in the following, serves for measuring the refracted waves emitted from a source placed below the crust. That is why it is called a refraction seismograph. However, the invention may concern seismographs which do not measure refracted waves.

The use of seismographs at the bottom of the sea presents specific problems. First of all, in shallow water a seismograph may be placed at the bottom by a diver who, like a land operator, positions the seismograph directly on a relatively horizontal part of the bottom, thereby ensuring correct direction placement to ensure a correct coupling. For depths reaching 100–200 meters, a seismic detector connected to a dead weight by a cable which extends to the surface of the water, where it is connected to a floating buoy, may be used. The cable serves to anchor the assembly of dead weight and the seismic detector, and to transmit the electric supply from the buoy to the detector and, in return, the electrical signals detected by the detector to the buoy. The buoy is preferably provided with a readio-electric transmitter for transmitting signals to a ship; the signals may alternatively be recorded before being dealt with. The dead weight is necessary particularly in regions subjected to strong tidal currents or disturbances. The distance between the dead weight and the seismic detector is, for example, 25–30 meters to ensure that the dead weight does not rest on the detector. The detector comprises duplexed instruments to permit it to function whatever its direction, and an electric switch for bringing into operation the appropriate instruments according to the direction of the detector in relation to the bottom. This system of buoy, cable, dead weight and seismic detector has the advantage of permitting the use of a detector with direct coupling to the bottom but it is not usable beyond a depth of about 200 meters. In fact, the length of cable dictates the time of descent or raising of the dead weight and with the longest cables this time becomes of the order of one day. Furthermore, the longer the cable the weaker the signals transmitted. From the economic point of view, long cables are very expensive.

In order to mitigate these drawbacks, two types of systems have already been proposed. In the first type of system, an autonomous assembly is used which is connected to a surface buoy by a nylon cable and which contains in a ballasted, pressure-resistant enclosure, not only the seismic detector but also an autonomous feed source and recorders, for example, magnetic recorders. These systems have the drawbacks that the nylon cable may be broken which entails the loss of the assembly. In the systems of the second type, an autonomous assembly is also used, the ballast of which is detachable and which is provided with floats so that without ballast the floatability of the assembly is positive. Thus, when under the action of a remote control signal the ballast is detached, the assembly ascends to the surface where it may be recovered.

These systems of the first and second type suffer common drawbacks due to the fact of the presence of the seismic detector at the rear of the enclosure. First of all, the coupling of the detector to the bottom of the sea is not direct. It receives vibrations from the earth's crust through the enclosure. In the enclosure, in the proximity of the detector, the magnetic recorders in operation create parasite vibrations which increase the noise of the detector. Furthermore, if the assembly is immersed in a rapid sea current, the enclosure is subject at its outer surface to fluctuations of speed of the water due to the bottom line which causes vibrations. Finally, the signal to noise relation of the detector is much less satisfactory than the case of the direct coupling usable in low depth as has been shown above.

One object of the present invention consists in providing a pick-up derived from the systems of the first or preferably of the second type which no longer has the drawbacks mentioned above and which permits of using a detector with direct coupling to the sea bed.

According to the present invention there is provided a pickup, such as a seismograph, intended to be used at the bottom of the sea, comprising a detector, a frame provided with a detachable ballast, a sealed, water-tight container mounted on the frame and floats for bringing the remainder of the pick-up to the surface when the ballast is detached, the frame including a means for supporting the detector outside the container and by which the detector may be loosened from the frame and deposited on the sea bed, said detector being connected to the container by means of an electric transmission cable and a mooring cable, the container containing an electrical feed source and recording means for recording signals delivered by the detector.

Preferably, said means supporting the detector is constituted by an arm support pivoted at one end to the frame, the arm support having at its free end at least one hook which engages complimentary means of the detector, the axis of pivoting of the arm support being at a certain height above the base of the ballast, the arm support extending in the initial position in which it holds the detector upwards, and being held in this position by suitable holding means, the arm support being arranged to pivot downwards by gravity when the holding means are released, the detector unhooking from the hook of the arm support when the latter reaches or exceeds the particular angular position.

According to another preferred feature, there are elastic return means connected to return the arm support to or towards the initial position, when the detector unhooks therefrom.

According to another preferred feature, the arm support comprises a sub-frame having two arms each of which has a hook shape at the free end.

According to another preferred feature, the detector includes a retaining member which co-operates with the frame when the detector is held thereby to prevent the detector from becoming detached from the frame prematurely.

According to another preferred feature, the frame has the shape of a star and the arm support is arranged to move in a plane between two branches of the star.

The features of the present invention mentioned above, as well as others, will appear more clearly on reading the following description of one embodiment, the said description being made in relation to the attached drawings, in which:

FIG. 3 is a diagrammatic view in section of the mooring device of the detector of FIG. 2, when in the resting or initial position;

FIG. 4 is a diagrammatic view in section of the device of

FIG. 3, when in the unhooked position; and

Figure 1:
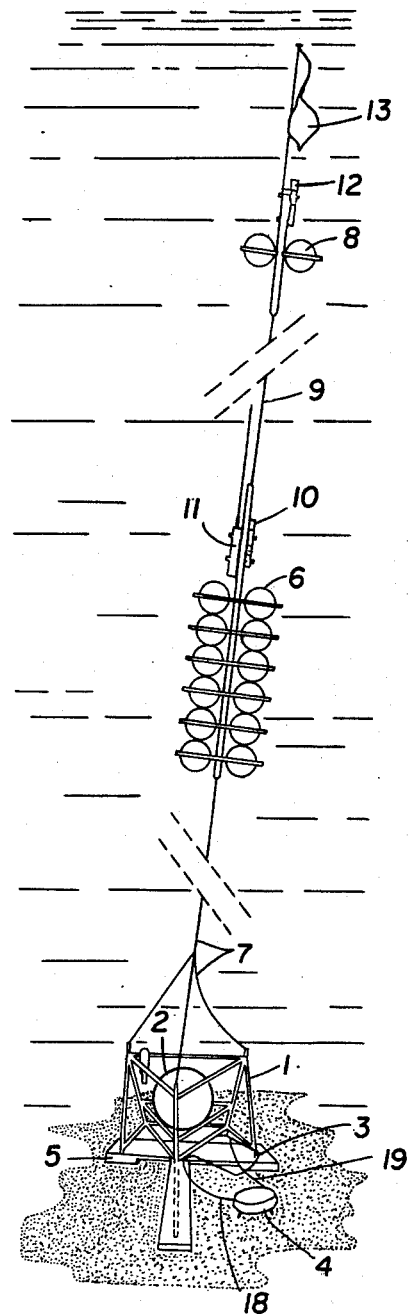
FIG. 1 is a diagrammatic view of a seismograph according to the embodiment of the invention, when resting on the bottom of the sea.
Figure 5:
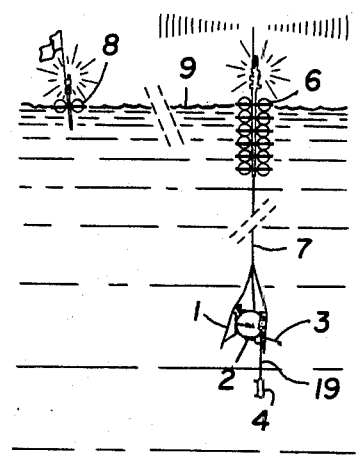

FIG. 5 is a diagrammatic view of the seismograph of FIG. 1 after ascent to the surface and before its recovery.

The seismograph of FIG. 1 comprises a frame 1, a hydrostatic pressure-resistant and water-tight sealed container 2, a mooring device 3, a seismic detector 4 and a ballast 5. The seismograph is also provided the frame 1 is connected by mooring cable 7 and an auxiliary float 8 connected to the main float 6 by a line 9. The float 6 is provided with illuminable means 10 and a radio electric transmitter 11. The float 8 is provided with illuminable means 12 and pennant 13.

The frame 1 is a star shaped tubular metal structure having three branches with three feet resting on the ballast 5. The branches of the frame are connected to one another by horizontal cross-pieces forming triangles at several levels. The frame is connected to the ballast by conventional fixing means which, upon receiving a remote control signal, detach the frame 1 from the ballast 5. These fixing means may be electro-magnetic or of the explosive bolt type. The cables 7 are connected to the upper ends of the branches of the frame. The tubes of the frame are made of steel or aluminium.

The container 2 is, in the example described, a sealed hollow sphere made of steel and capable of resisting the hydrostatic pressure prevailing at the depth of use envisaged. It contains electronic circuits such as those necessary to receive the mooring order for detachment of the ballast 5 by operating the means mentioned above or to receive the mooring order for detachment of the seismic detector 4, cells or electric batteries for the feeding of the different circuits or apparatus and a recorder for signals received from the seismic detector 4. The container 2 is water-tight and hollow and has water-tight passages for the different cables which connect it to the fixing means of the ballast, to the control means of the mooring device 3 and to the detector. The container 2 may be filled with a gas such as freon to avoid moisture condensation at low temperature.

Figure 2:
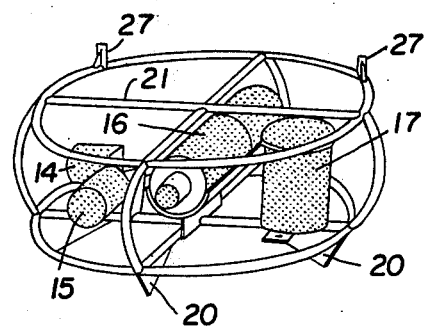
FIG. 2 is a view in perspective of a seismic detector forming part of the seismograph of FIG. 1.

The seismic detector 4, shown to a larger scale in FIG. 2, is a tubular metal structure to which are fixed various measuring instruments such as two horizontal sound detectors 14 and 15 orientated orthoganally, a hydrophone or a vertical sound detector 16 and a mercury electric switch 17. The sound detectors 14, 15 and 16 and the hydrophone are well-known instruments. The switch 17 serves to determine the position of a detector in respect of a horizontal plane and indicates in particular whether the detector is inclined too much to effect measurements or whether it is practically horizontal and whether the detector may give valid results. The assembly of these instruments is connected to the container 2 by a bundle of electric wires joined together in a cable 18. In addition, the structure of the detector 4 is connected to the frame by a rope or a connecting chain 19, FIG. 1. In practice, the tubular structure of the detector 4 is therefore open and allows water to pass in order to create only a minimum drag, serves to protect the instruments and to establish a direct coupling with the sea bed. The face of the structure turned towards the sea bed is provided with four feet 20 which are shaped to make good contact with the sea bed. The top of the structure has in particular a cross-piece member 21 which serves to enable the detector 4 to be hooked to the mooring device 3 as will be seen later in detail in relation to FIGS. 3 and 4.

FIG. 3 shows, in section, the structure (without the instruments, to simplify the drawing) of the detector 4 when hooked by the member 21 to the mooring device 3; this is the resting or initial position. The mooring device 3 is an arm support having two arms, FIG. 1, the free ends 22 of which may pivot about the axles 23 fixed by brackets 24 on the cross-piece 25 of the frame 1. In the resting position, the arm support 3 is held practically vertical along one face of the frame by a holding member for example an electro-magnetic device (not shown), fixed on a tube of the frame 1. At the free end of each arm of the support 3 there is a hook 26 in which the adjacent part of the cross-piece member 21 locates. The structure of the detector 4 has at each of two points which are horizontally aligned in the initial position, two reclaiming hooks or claws 27 which in the resting position are hooked under the upper cross-piece 28 of the frame. Thus, the structure of 4 cannot rise under the action of vibrations or shock and become prematurely unhooked from the hooks 26.

Between the handle 3 and the frame are mounted elastic ribbons or straps 29 the function of which will be seen in the following. The cable 18 electrically connects the detector 4 to the container 2, whilst the rope 19 connects the structure to a bracket 30 fixed at the foot of the frame. When the holding means holding the support 3 is operated, the weight of the detector 4 causes the handle to turn downwards unwedging the hooks 27 and the support 3 and detector 4 pivot downwards.

When the support 3 reaches the position indicated in FIG. 4, the member 21 escapes from the hooks 26 and the detector 4, the equilibrium of which has been arranged so that it takes up a horizontal position around 21, falls onto the sea bed, the feet first as the height of the axles 23 is sufficiently low for the detector not to have the possibility of falling edgewise onto the sea bed. The length of the arm of the lever of the support 3 is sufficiently large for the detector 4 to be dropped outside the confines of the frame 1. The elastic ribbons 29 are stretched and lengthened until the detector 4 leaves the support 3. They then cause the support 3 to rise to or towards the initial position so that the movements of the latter do not disturb the functioning of the detector. It should be noted that the detector 4 falls very slowly in the water.

A complete sequence of the operation of the seismograph will now be described. First of all the assembly shown in FIG. 1 is put in the water from a ship and sinks slowly to the sea bed. A timing circuit, the delay of which may be regulated according to the estimated depth, releases the holding member of the support 3 of the detector 4. Sufficient time is provided for the loosening of detector 4 to take place once the seismograph is at the sea bed. The switch 17 sends to the container 2 a signal indicating whether the detector 4 may or may not operate according to the slope of the bottom. The container 2 contains acoustic ignition means which permit of transmitting the indication of position of 4 to the ship associated with the seismograph. If the signal indicates that the detector cannot operate, the ship gives acoustically the order to loosen the ballast 5. The assembly, due to the floatability of the floats 6 and 8, then ascends to the surface, as shown in FIG. 5. The container 2 and the frame 1 hang below the float 6 and the detector 4 hangs below the frame 1 to which it is connected by the rope 19. Between the floats 6 and 8 the line 9 permits easy picking up of the assembly. The illuminable means 10 and 12 as well as the electro-radio transmitter 11 are put conventionally into operation when the floats emerge.

If the signal from the switch 17 indicates that the detector 4 may operate in a suitable manner, the acoustic signals are exchanged between the container and the ship to determine the placing of the seismograph in relation to the ship and to synchronise the operation of the time bases in the seismograph and in the ship. The ship then releases the conventional explosions, the detector of which detects the refracted waves. After the end of the explosions the ship gives the order for loosening of the ballast and the assembly rises to the surface, as indicated, to be picked up again. The recordings realised from the signals detected are then made use of.

It should be noted that the three branch star shape of the ballast 5 associated with the triangular aspect of the frame 1 permits of utilising a support 3, the length of the arm of which is relatively short, guaranteeing a putting in place of the detector outside the perimeter of the base of the ballast 5.

It should be noted that the laying means according to the invention may obviously serve for laying in the bottom of the sea other signal pick ups than those intended for detecting acoustic signals.

Although the principles of the present invention have been described above in relation to one embodiment, it must be understood that the said description is only made by way of example and does not limit the scope of the invention.

We claim:

1. A pick-up, such as a seismograph, intended to be used at the bottom of the sea, comprising a detector, a frame provided with a detachable ballast, a sealed, water-tight container mounted on the frame and floats for bringing the remainder of the pick-up to the surface when the ballast is detached, the frame including a means for supporting the detector outside the container and by which the detector may be loosened from the frame and deposited on the sea bed, the said detector being connected to the container by means of an electric transmission cable and mooring cable, the container containing an electrical feed source and recording means for recording signals delivered by the detector.

2. A pick-up according to claim 1, wherein said means supporting the detector is constituted by an arm support pivoted at one end of the frame, the arm support having at its free end at least one hook which engages complimentary means of the detector, the axis of pivoting of the arm support being at a certain height above the base of the ballast, the arm support extending in the initial position in which it holds the detector upwards, and being held in this position by suitable holding means, the arm support being arranged to pivot downwards by gravity when the holding means are released, the detector unhooking from the hook of the arm support when the latter reaches or exceeds the particular angular position.

3. A pick-up according to claim 2, including elastic return means connected to return the arm support to or towards the initial position, when the detector unhooks therefrom.

4. A pick-up according to claim 3, wherein the arm support comprises a sub-frame having two arms each of which has a hook shape at the free end.

5. A pick-up according to claim 3, the detector including a retaining member which co-operates with the frame when the detector is held thereby, to prevent the detector from becoming detached from the frame prematurely.

6. A pick-up according to claim 3, wherein the frame has the shape of a star and the arm support is arranged to move in a plane between two branches of the star.

7. A pick-up according to claim 3, wherein the detector is a seismic detector.

8. A pick-up according to claim 2, wherein the arm support comprises a sub-frame having two arms each of which has a hook shape at the free end.

9. A pick-up according to claim 8, the detector including a retaining member which co-operates with the frame when the detector is held thereby, to prevent the detector from becoming detached from the frame prematurely.

10. A pick-up according to claim 8, wherein the frame has the shape of a star and the arm support is arranged to move in a plane between two branches of the star.

11. A pick-up according to claim 8 wherein the detector is a seismic detector.

12. A pick-up according to any one of claim 2, the detector including a retaining member which co-operates with the frame when the detector is held thereby, to prevent the detector from becoming detached from the frame prematurely.

13. A pick-up according to claim 12, wherein the detector is a seismic detector.

14. A pick-up according to any one of the claim 2, wherein the frame has the shape of a star and the arm support is arranged to move in a plane between two branches of the star.

15. A pick-up according to claim 14, wherein the detector is a seismic detector.

16. A pick-up according to claim 2, wherein the detector is a seismic detector.

17. A pick-up according to any one of the claim 1, wherein the detector is a seismic detector.

* * * * *

UNITED STATES PATENT AND TRADEMARK OFFICE
CERTIFICATE OF CORRECTION

PATENT NO. : 4,138,658
DATED : February 6, 1979
INVENTOR(S) : Felix Avedik et al It is certified that error appears in the above-identified patent and that said Letters Patent are hereby corrected as shown below:

Col. 3, line 20, after "provided" insert --with a main float 6 to which--

Signed and Sealed this

Eleventh Day of September 1979

[SEAL]

Attest:

Attesting Officer

LUTRELLE F. PARKER
Acting Commissioner of Patents and Trademarks